United States Patent
Mieslinger (10) Patent No.: US 8,991,709 B2
(45) Date of Patent: Mar. 31, 2015

(54) TAMPER-PROOF RFID LABEL

(75) Inventor: Stefan Mieslinger, Kottgeisering (DE)

(73) Assignee: Tagstar Systems GmbH, Sauerlach (DE)

(*) Notice: Subject to any disclaimer, the term of this patent is extended or adjusted under 35 U.S.C. 154(b) by 230 days.

(21) Appl. No.: 13/217,096

(22) Filed: Aug. 24, 2011

(65) Prior Publication Data

US 2012/0145794 A1    Jun. 14, 2012

Related U.S. Application Data

(60) Provisional application No. 61/378,359, filed on Aug. 30, 2010.

(51) Int. Cl.
| | | |
|---|---|---|
| *G06K 19/06* | (2006.01) | |
| *G06K 19/07* | (2006.01) | |
| *G06K 19/077* | (2006.01) | |
| *H01P 11/00* | (2006.01) | |
| *G06K 19/073* | (2006.01) | |

(52) U.S. Cl.
CPC ........ *G06K 19/0723* (2013.01); *G06K 19/0739* (2013.01); *G06K 19/07749* (2013.01); *G06K 19/07779* (2013.01); *G06K 19/07798* (2013.01); *H01P 11/00* (2013.01)
USPC ........................................................ 235/492

(58) Field of Classification Search
CPC ................... G06K 19/07749; G06K 19/0739; G06K 19/07798; G06K 19/0723; G06K 19/07779; G06K 19/07783; G06K 19/07381
USPC ............................ 235/492; 340/572.1–572.3
See application file for complete search history.

(56) References Cited

U.S. PATENT DOCUMENTS

| | | | |
|---|---|---|---|
| 5,574,470 A * | 11/1996 | de Vall | 343/895 |
| 6,206,292 B1 | 3/2001 | Robertz et al. | |
| 6,794,000 B2 * | 9/2004 | Adams et al. | 428/40.1 |
| 6,888,502 B2 | 5/2005 | Beigel et al. | |
| 7,017,822 B2 | 3/2006 | Aisenbrey | |
| 7,049,962 B2 | 5/2006 | Atherton et al. | |
| 7,093,767 B2 | 8/2006 | Faenza, Jr. et al. | |
| 7,095,324 B2 * | 8/2006 | Conwell et al. | 340/572.1 |
| 7,098,764 B2 | 8/2006 | Schaumburg et al. | |
| 7,152,040 B1 | 12/2006 | Hawthorne et al. | |

(Continued)

FOREIGN PATENT DOCUMENTS

WO        2005/106782        11/2005

OTHER PUBLICATIONS

Partial International Search Report from corresponding foreign application No. PCT/EP2011/004290 dated Dec. 19, 2011, 5 pgs.

(Continued)

*Primary Examiner* — Christopher Stanford
(74) *Attorney, Agent, or Firm* — Proskauer Rose LLP (57) ABSTRACT

Described are RFID structures and methods for forming RFID structures. An RFID structure includes an antenna substrate and a loop antenna assembly positioned on the antenna substrate. The loop antenna assembly includes at least two contact pads and a plurality of antenna loop windings having an average spacing between adjacent antenna loop windings of the plurality of loop windings. The plurality of antenna loop windings define one or more gap regions that separate adjacent or adjoining antenna segments of the plurality of antenna loop windings by at least twice the average spacing.

13 Claims, 10 Drawing Sheets

(56) References Cited

U.S. PATENT DOCUMENTS

| | | |
|---|---|---|
| 7,168,626 B2 | 1/2007 | Lerch et al. |
| 7,187,293 B2 | 3/2007 | White et al. |
| 7,202,790 B2 | 4/2007 | Copeland et al. |
| 7,369,048 B2 | 5/2008 | Freund |
| 7,387,233 B2 | 6/2008 | Masuta |
| 7,411,498 B2 | 8/2008 | Forster |
| 7,436,305 B2 | 10/2008 | Clare et al. |
| 7,546,671 B2 | 6/2009 | Finn |
| 7,557,715 B1 | 7/2009 | Noakes et al. |
| 7,561,114 B2 | 7/2009 | Maezawa et al. |
| 7,564,354 B2 * | 7/2009 | Eren et al. ................. 340/572.1 |
| 7,564,359 B2 | 7/2009 | Koh et al. |
| 7,581,308 B2 | 9/2009 | Finn |
| 7,586,415 B2 | 9/2009 | Lee |
| 7,623,034 B2 | 11/2009 | Ferguson et al. |
| 7,675,464 B2 | 3/2010 | Cleeves |
| 7,688,206 B2 | 3/2010 | Carrender |
| 7,701,346 B2 | 4/2010 | Lindsay et al. |
| 7,714,727 B2 | 5/2010 | White et al. |
| 7,728,726 B2 | 6/2010 | Berson |
| 7,740,179 B2 | 6/2010 | Mattlin et al. |
| 7,744,004 B2 | 6/2010 | Kato et al. |
| 7,744,005 B2 | 6/2010 | Yin |
| 2002/0036237 A1 | 3/2002 | Atherton et al. |
| 2004/0256469 A1 | 12/2004 | Faenza, Jr. et al. |
| 2005/0012616 A1* | 1/2005 | Forster et al. ............. 340/572.7 |
| 2005/0023359 A1 | 2/2005 | Saunders |
| 2006/0092028 A1 | 5/2006 | Lerch et al. |
| 2006/0109130 A1 | 5/2006 | Hattick et al. |
| 2006/0202829 A1 | 9/2006 | Girvin et al. |
| 2007/0029384 A1 | 2/2007 | Atherton |
| 2007/0159339 A1* | 7/2007 | Matsuura et al. .......... 340/572.8 |
| 2007/0164867 A1* | 7/2007 | Kawai ........................ 340/572.7 |
| 2007/0244657 A1 | 10/2007 | Drago et al. |
| 2007/0257802 A1 | 11/2007 | Koh et al. |
| 2008/0117058 A1 | 5/2008 | Oberle |
| 2008/0131669 A1 | 6/2008 | Michalk |
| 2008/0142154 A1 | 6/2008 | Green et al. |
| 2008/0149584 A1 | 6/2008 | Martinelli |
| 2008/0157975 A1 | 7/2008 | White et al. |
| 2008/0202300 A1 | 8/2008 | Steidinger et al. |
| 2008/0211676 A1 | 9/2008 | Commagnac et al. |
| 2008/0266108 A1 | 10/2008 | Teeter |
| 2008/0272885 A1 | 11/2008 | Atherton |
| 2008/0308641 A1* | 12/2008 | Finn .............................. 235/492 |
| 2008/0309497 A1 | 12/2008 | Bryant |
| 2009/0021377 A1* | 1/2009 | Launiainen ................ 340/572.1 |
| 2009/0045963 A1 | 2/2009 | Vigneron et al. |
| 2009/0058599 A1 | 3/2009 | Calvarese |
| 2009/0101281 A1 | 4/2009 | Sacherer |
| 2009/0128340 A1 | 5/2009 | Masin |
| 2009/0199966 A1 | 8/2009 | Coleman et al. |
| 2009/0229109 A1 | 9/2009 | Finn |
| 2009/0237215 A1 | 9/2009 | Dunlap et al. |
| 2009/0237249 A1 | 9/2009 | Bielas |
| 2009/0291271 A1 | 11/2009 | Michalk et al. |
| 2009/0315320 A1 | 12/2009 | Finn |
| 2010/0065647 A1 | 3/2010 | Ritamaki et al. |
| 2010/0065648 A1 | 3/2010 | Warther |
| 2010/0126000 A1 | 5/2010 | Forster |
| 2010/0156642 A1 | 6/2010 | Lindsay et al. |
| 2010/0181381 A1 | 7/2010 | Carrender |
| 2010/0182149 A1 | 7/2010 | Marino |

OTHER PUBLICATIONS

*Tamper Evident Technology*. Falken Secure Networks Application Brochure 0838 (10 pages); accessed on Aug. 25, 2011 at http://www.falkensecurenetworks.com/PDFs/0838_Tamper-Evident_RFID_Labels_and_Seals.pdf.

* cited by examiner

| COVER FOIL 520 |
| --- |
| BRIDGE METALLIZATION 515 |
| INSULATION LAYER 510 |
| ANTENNA METALLIZATION 505 |
| ANTENNA SUBSTRATE 501 |
| SHIELDING MATERIAL 525 |

| COVER FOIL 520 |
| --- |
| TOPSIDE METALLIZATION 530 |
| ANTENNA SUBSTRATE 501 |
| BACKSIDE METALLIZATION 540 |
| SHIELDING MATERIAL 525 |

TAMPER-PROOF RFID LABEL

RELATED APPLICATIONS

This application claims priority to and the benefit of U.S. Provisional Patent Application No. 61/378,359, filed on Aug. 30, 2010, the entire contents of which are incorporated herein by reference in their entirety.

FIELD OF THE INVENTION

The invention relates generally to RFID structures and methods for forming RFID structures.

BACKGROUND OF THE INVENTION

Radio-Frequency Identification (RFID) technology is directed to wireless communication between one object, typically referred to as a RFID tag, and another object, typically referred to as a RFID reader/writer. RFID technology has been adopted, and is increasingly being used, in virtually every industry, including, for example, manufacturing, transportation, retail, and waste management. As such, secure and reliable RFID systems are becoming increasingly important as the demand for RFID technology increases.

Figure 1:
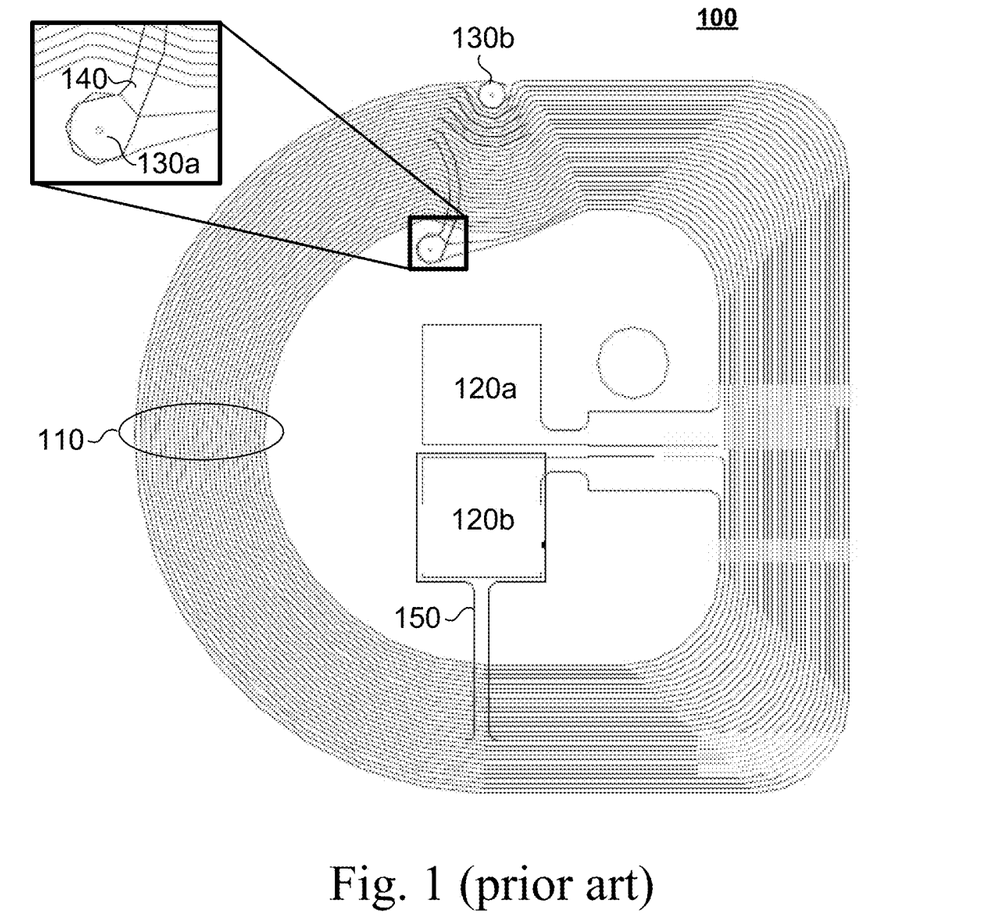
FIG. 1 is a top-view of a RFID antenna assembly according to the prior art.

RFID tags typically include two components: a RFID antenna assembly and an RFID integrated circuit (IC). FIG. 1 is a top-view of a RFID antenna assembly 100 according to the prior art. Antenna assembly 100 includes a plurality of antenna loop windings 110, two contact pads 120a and 120b for connecting to the IC chip (not shown), two cross-over points 130a and 130b, a cross-over track 140 which is formed on an opposite layer as the loop windings 110, and capacitive tuning elements 150 also formed on an opposite layer as the loop windings 110. RFID antennas can be used to receive and/or transmit an electromagnetic signal from a RFID reader/writer. A RFID IC (sometimes referred to as a RFID chip) can be used to store and/or process information (e.g., modulate/demodulate a radio-frequency (RF) signal).

In some applications, RFID tags are secured as adhesive labels to objects for identification purposes. Such adhesive tags can be tampered with by removing the RFID tag, and possibly affixing the tag to another object. Without a visual inspection of the object being tagged, the authenticity of objects with RFID tags that have been tampered with is suspect.

SUMMARY OF THE INVENTION

One approach to providing a tamper-proof RFID structure is to configure the RFID structure to become inoperable if it is tampered with. In one aspect, there is a RFID structure. The RFID structure includes an antenna substrate and a loop antenna assembly positioned on the antenna substrate. The loop antenna assembly includes at least two contact pads and a plurality of antenna loop windings having an average spacing between adjacent antenna loop windings of the plurality of loop windings. The plurality of antenna loop windings define one or more gap regions that separate adjacent or adjoining antenna segments of the plurality of antenna loop windings by at least twice the average spacing.

In another aspect, there is a RFID structure. The RFID structure includes an antenna assembly and an antenna substrate. The antenna assembly includes a dipole antenna track and at least two contact pads. The dipole antenna track defines one or more gap regions that separate adjacent or adjoining segments of the dipole antenna track. The antenna substrate supports the antenna assembly. The antenna substrate includes one or more perforations positioned in the one or more gap regions.

In another aspect, there is a method of manufacturing a RFID structure. The method includes providing an antenna substrate and providing a loop antenna assembly on the antenna substrate. The loop antenna assembly includes at least two contact pads and a plurality of antenna loop windings having an average spacing between adjacent antenna loop windings of the plurality of loop windings. The plurality of antenna loop windings define one or more gap regions that separate adjacent or adjoining antenna segments of the plurality of antenna loop windings by at least twice the average spacing.

In another aspect, there is a method of manufacturing a RFID structure. The method includes providing an antenna substrate and providing an antenna assembly on the antenna substrate. The antenna assembly includes a dipole antenna track and at least two contact pads. The dipole antenna track defines one or more gap regions that separate adjacent or adjoining segments of the dipole antenna track. The method also includes forming one or more perforations positioned in the one or more gap regions.

In another aspect, there is a RFID structure. The RFID structure includes a loop antenna assembly and an antenna substrate. The loop antenna assembly includes at least two contact pads and a plurality of antenna loop windings. The antenna substrate supports the loop antenna assembly. The antenna substrate includes one or more perforations. At least one of the one or more perforations overlaps an area covered by a segment of the plurality of antenna loop windings.

In other examples, any of the aspects above can include one or more of the following features. The antenna substrate can include one or more perforations positioned in the one or more gap regions. The one or more perforations can include one or more cuts, one or more holes, one or more slits, or any combination thereof. The plurality of antenna loop windings can include one or more outer antenna loop windings and one or more inner antenna loop windings. At least one of the one or more gap regions separate an antenna segment on an outermost winding of the one or more inner antenna loop windings with an adjacent antenna segment on an innermost winding of the one or more outer loop windings. The plurality of antenna loop windings can include at least one track that includes two adjoining antenna segments defining lines having an angle less than 15 degrees. At least one of the one or more gap regions can be positioned between the two adjoining antenna segments. The at least one track can include an outermost antenna loop winding of the plurality of antenna loop windings. The at least one track can include an innermost antenna loop winding of the plurality of antenna loop windings.

In some embodiments, the average spacing is between 0.05 mm and 0.5 mm. In some embodiments, the average spacing is between 0.08 mm and 0.12 mm. The one or more gap regions can separate adjacent or adjoining antenna segments of the plurality of antenna loop windings by between 0.1 mm and 1.0 mm. The antenna substrate can include a carrier foil including PET, PET-G, PP, PE, PI, PVC, ABS, LCP, PBT, PEN, glass fiber, epoxy, BT, PC or any combination thereof. The RFID structure can further include an adhesive layer on a surface of the antenna substrate opposite the loop antenna assembly. The RFID structure can further include an adhesive layer on a surface of the antenna substrate opposite the antenna assembly. The RFID structure can further include an integrated circuit coupled to the at least two contact pads. The RFID structure can further include a protective layer covering the loop antenna assembly and the integrated circuit. The RFID structure can include a RFID label.

In some embodiments, the dipole antenna track includes at least two adjoining antenna segments that define lines having an angle less than 15 degrees. At least one of the one or more gap regions can be positioned between the two adjoining antenna segments. The one or more gap regions can separate the two adjoining antenna segments by between 0.16 mm and 1.0 mm. The method can further include forming one or more perforations in the antenna substrate, the one or more perforations positioned in the one or more gap regions. Forming the one or more perforations comprises punching the antenna substrate using a punch-press, heating the antenna substrate using a laser, or both. The plurality of antenna loop windings can include one or more outer antenna loop windings and one or more inner antenna loop windings. At least one of the one or more gap regions can separate an antenna segment on an outermost winding of the one or more inner antenna loop windings with an adjacent antenna segment on an innermost winding of the one or more outer loop windings.

In some embodiments, the plurality of antenna loop windings include at least one track that includes two adjoining antenna segments that define lines having an angle less than 15 degrees. At least one of the one or more gap regions can be positioned between the two adjoining antenna segments. The at least one track can include an outermost antenna loop winding of the plurality of antenna loop windings. The at least one track can include an innermost antenna loop winding of the plurality of antenna loop windings.

In some embodiments, the method further includes applying an adhesive layer on a surface of the antenna substrate opposite the loop antenna assembly. The method can also include coupling an integrated circuit to the at least two contact pads. The method can also include applying a protective layer covering the loop antenna assembly and the integrated circuit. The method can also include applying an adhesive layer on a surface of the antenna substrate opposite the antenna assembly.

Any of the implementations can realize one or more of the following advantages. Perforations can provide for secure and tamper-proof RFID structures (e.g., RFID labels). In some embodiments, perforations can be applied to small antenna assembly structures while minimizing the negative influence on antenna performance. Punching processes can be accurately archived. Laser cutting processes can apply perforations to smaller labels compared to standard punch pattern.

The details of one or more examples are set forth in the accompanying drawings and the description below. Further features, aspects, and advantages of the invention will become apparent from the description, the drawings, and the claims. The drawings are not necessarily to scale, emphasis instead generally being placed upon illustrating the principles of the invention.

BRIEF DESCRIPTION OF THE DRAWINGS

The foregoing and other objects, features, and advantages of the present invention, as well as the invention itself, will be more fully understood from the following description of various embodiments, when read together with the accompanying drawings.

DETAILED DESCRIPTION

Figure 2:
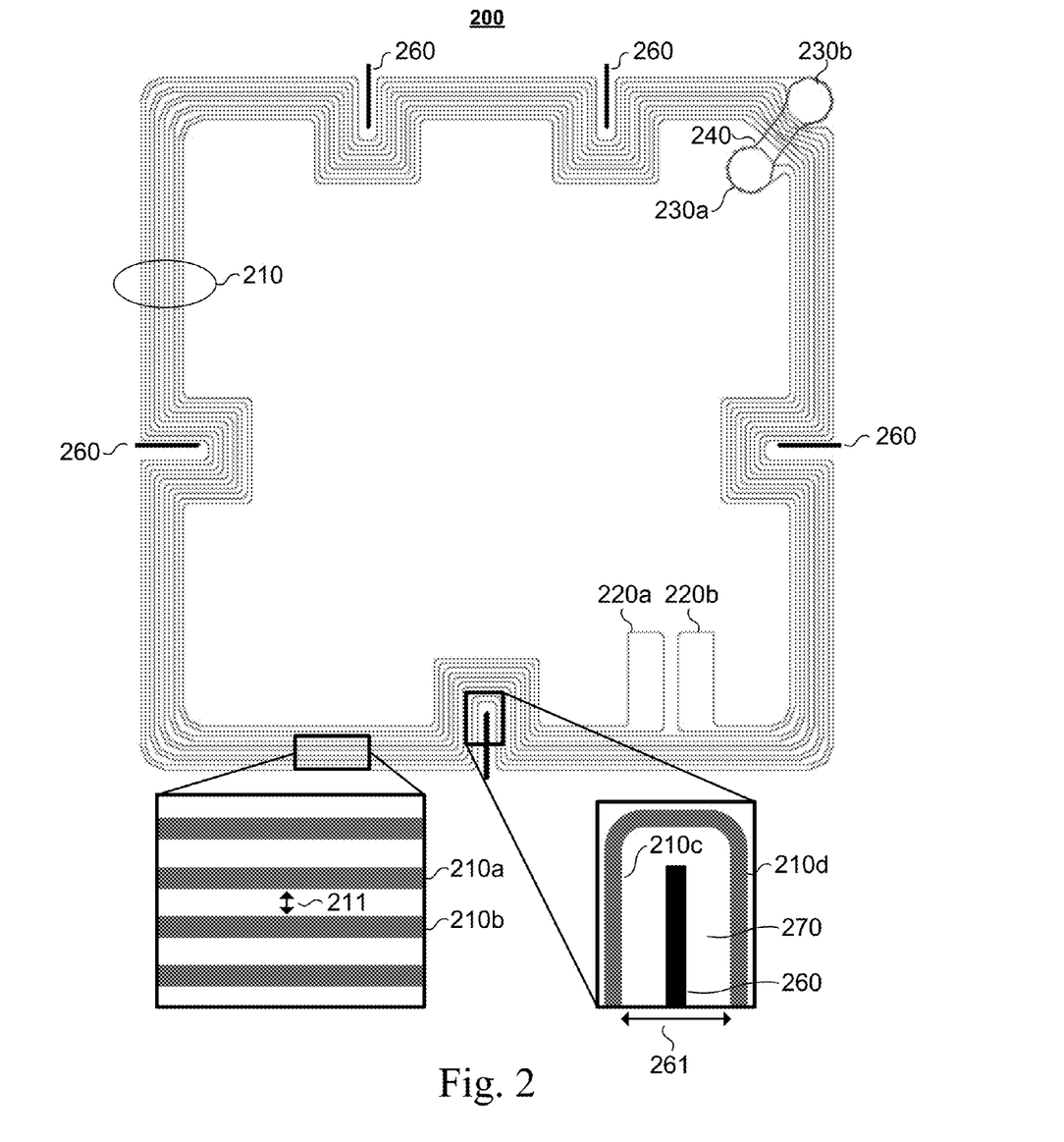
FIG. 2 is a top-view of a RFID antenna assembly.

FIG. 2 is a top-view of a RFID antenna assembly configuration 200. Antenna assembly 200 includes a plurality of antenna loop windings 210, contact pads 220a and 220b for electrically connecting to an IC chip or other control unit device (not shown), two cross-over points 230a and 230b, and a cross-over track 240 which is formed on an opposite layer as the loop windings 210. The plurality of antenna loop windings 210 include adjacent antenna tracks (e.g., track 210a and 210b) that are spaced apart by, for example, distance 211. In some embodiments, the width of each antenna track can be between 0.05 mm and 0.5 mm (e.g., between 0.05 mm and 0.3 mm for small antennas). In some embodiments, the average distance of the spacing between adjacent tracks in the plurality of antenna loop windings 210 is designed to be as small as possible (e.g., between 0.05 mm and 0.5 mm) in order to optimize the performance of the RFID antenna assembly (e.g., a high frequency (HF) RFID operating at 13.56 MHz).

Antenna assembly 200 also defines a plurality of gap regions (e.g., gap region 270) in which one or more perforations 260 can be positioned. Perforations 260 can include, in any combination, one or more cuts, one or more holes, and/or one or more slits made into a substrate (not shown) on which antenna assembly 200 is positioned on. Gap region 270, for example, is defined by two adjoining antenna track segments 210c and 210d that are spaced apart by a distance 261. Antenna track segments 210c and 210d are part of the outermost antenna loop winding of the plurality of antenna loop windings 210. In some embodiments, gap distance 261 is at least twice the average spacing between adjacent tracks in the plurality of antenna loop windings 210. In some embodiments, gap distances can range between at least two and fives times the average spacing (e.g., between 0.16 mm and 1.0 mm). The widened gap regions with respect to the average spacing advantageously allows perforations to be created in an antenna substrate without damaging the antenna assembly.

Perforations can be formed by punching the antenna substrate using a punch-press (e.g., rotary punch, flatbed punch, etc.), cutting, heating the antenna substrate using a laser (e.g., laser cutting and/or laser engraving), or both. Perforations in the antenna substrate can advantageously work as predetermined break point(s). For example, an adhesive RFID label including a perforated substrate can be applied to an object for tracking. As break points, the perforations on the substrate can cause the RFID antenna to break apart if someone tries to remove it from the object, thereby rendering the RFID structure inoperable.

Figure 2A:
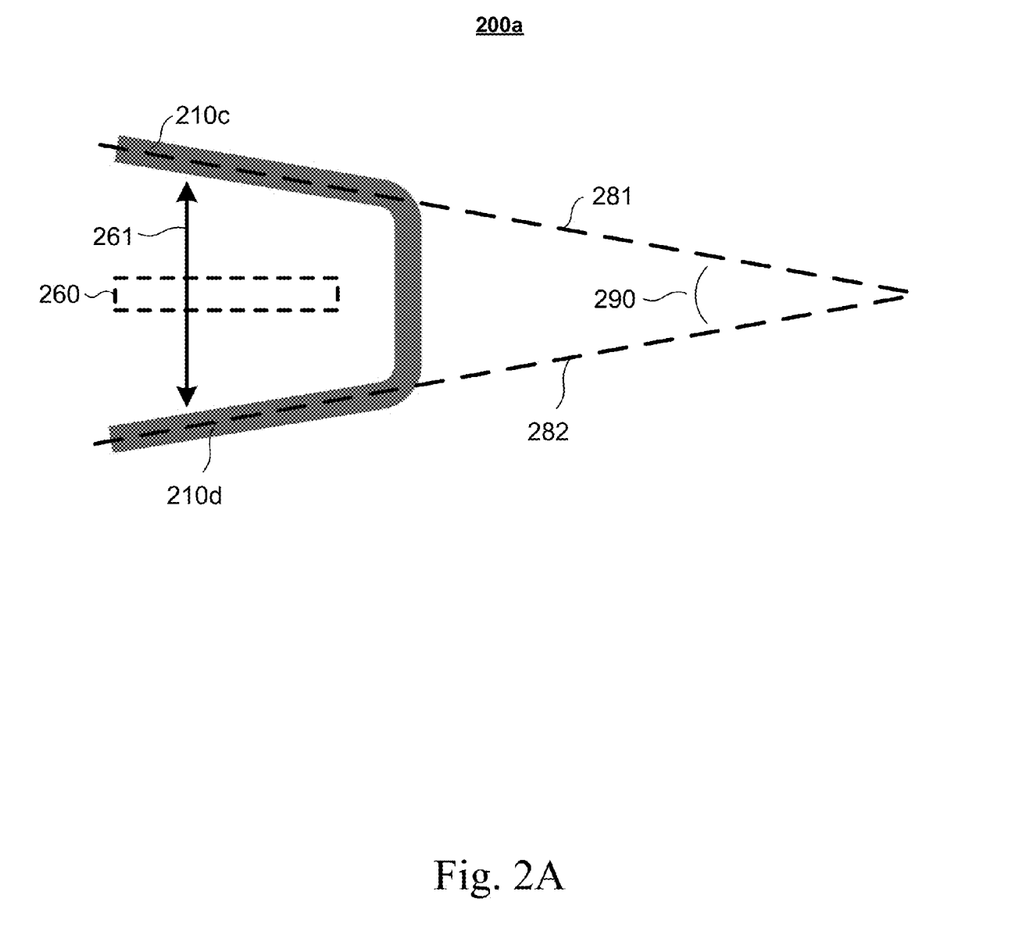
FIG. 2A is a top-view of two adjoining antenna segments.

FIG. 2A is a top-view 200a of two adjoining antenna segments 210c and 210d. Antenna segments 210c and 210d define, respectively, lines 281 and 282. In some embodiments, the angle 290 define by lines 281 and 282 is less than 15 degrees. In some embodiments, angle 290 is less than 45 degrees.

FIGS. 3A-3H are top-views of different RFID antenna assembly configurations 300a-300h. Each of the antenna assemblies include a plurality of antenna loop windings, contact pads 320a and 320b for electrically connecting to an IC chip or other control unit device (not shown), two cross-over points 330a and 330b, and a cross-over track 340 which is formed on an opposite layer as the loop windings.

Figure 3A:
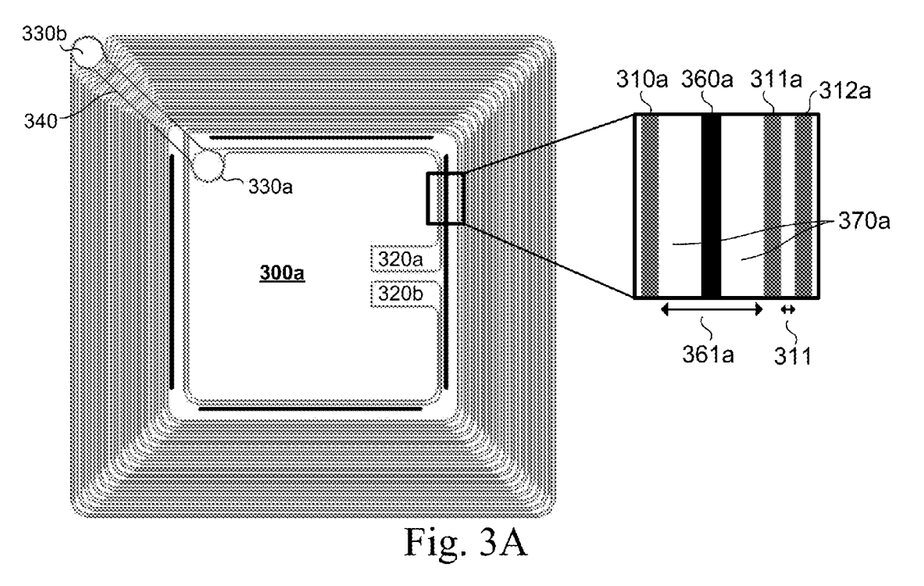
FIGS. 3A-3H are top-views of different RFID antenna assembly configurations.
Figure 3B:
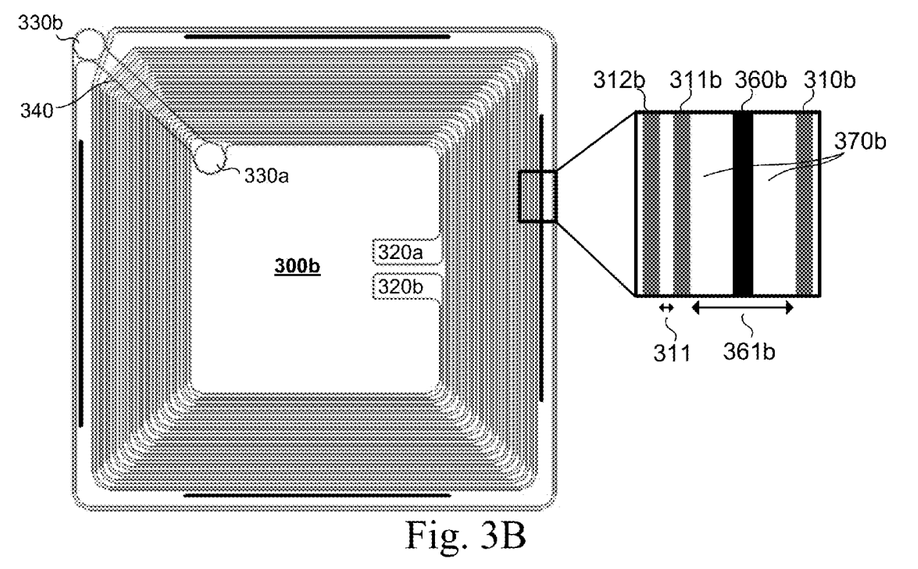
Figure 3C:
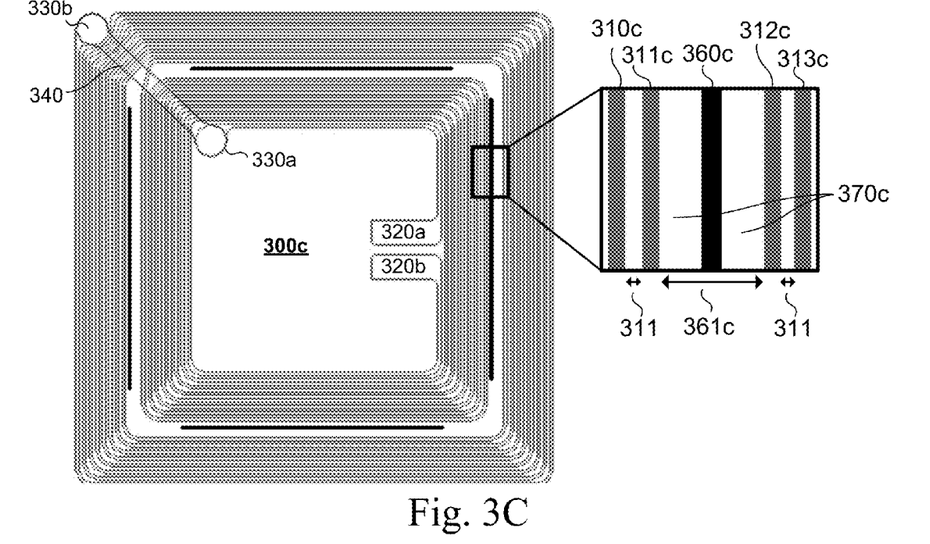

FIGS. 3A-3C are top-views of RFID antenna assembly configurations 300a-300c that include one or more gap regions between adjacent antenna loop windings. Antenna loop windings in configuration 300a include an inner antenna loop winding 310a and a plurality of outer antenna loop windings (e.g., 311a and 312a). The outer antenna loop windings are spaced apart by, for example, distance 311. Inner antenna loop winding 310a and an innermost antenna loop winding 311a from the group of outer antenna loop windings can define a one or more gap regions (e.g., gap region 370a) in which one or more perforations 360a can be positioned. Adjacent antenna track segments 310a and 311a are spaced apart by a distance 361a.

Antenna loop windings in configuration 300b include an outer antenna loop winding 310b and a plurality of inner antenna loop windings (e.g., 311b and 312b). The inner antenna loop windings are spaced apart by, for example, distance 311. Outer antenna loop winding 310b and an outermost antenna loop winding 311b from the group of inner antenna loop windings can define one or more gap regions (e.g., gap region 370b) in which one or more perforations 360b can be positioned. Adjacent antenna track segments 310b and 311b are spaced apart by a distance 361b.

Antenna loop windings in configuration 300c include a plurality of inner antenna loop windings (e.g., 310c and 311c) and a plurality of outer antenna loop windings (e.g., 312c and 313c). Adjacent tracks within the inner and outer antenna loop windings are spaced apart by, for example, distance 311. An outermost antenna loop winding 311c from the group of inner antenna loop windings and an innermost antenna loop winding 312c from the group of outer antenna loop windings can define one or more gap regions (e.g., gap region 370c) in which one or more perforations 360c can be positioned. Adjacent antenna track segments 311c and 312c are spaced apart by a distance 361c.

Figure 3D:
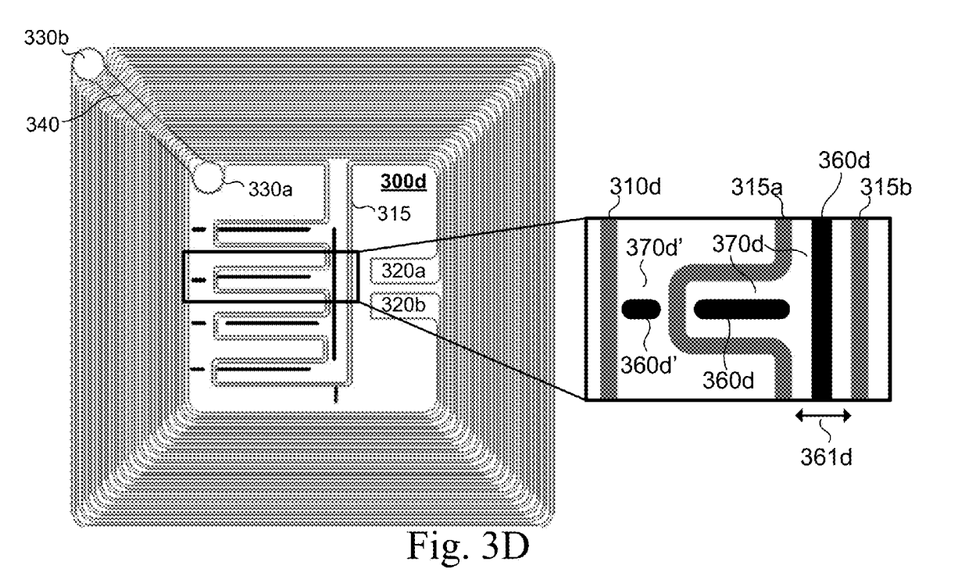

FIG. 3D is a top-view of a RFID antenna assembly configuration 300d that includes one or more gap regions between adjoining segments of a cross-over antenna track. Antenna assembly 300d include an innermost antenna loop winding 312d from a plurality of antenna loop windings and an antenna loop winding cross-over track 315. Antenna loop winding cross-over track 315 connects contact pad 320a with cross-over point 330a. Cross-over track 315 includes antenna segments 315a and 315b. In some embodiments, segments (e.g., 315a and 315b) of cross-over track 315 can define a one or more gap regions (e.g., gap regions 370d) in which one or more perforations 360d can be positioned. Adjoining antenna track segments 315a and 315b are spaced apart by a distance 361d. In alternative or supplemental embodiments, segments of cross-over track 315 can define one or more gap regions (e.g., gap region 370d') with respect to an innermost antenna loop winding 310d from the plurality of antenna loop windings, in which one or more perforations (e.g., 360d') can be positioned.

Figure 3E:
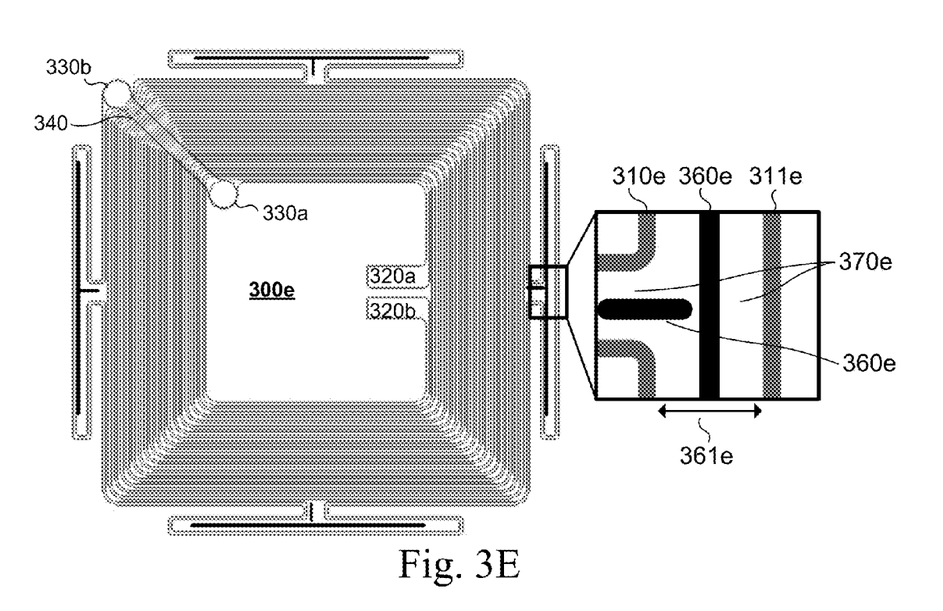

FIG. 3E is a top-view of a RFID antenna assembly configuration 300e that includes one or more gap regions between adjoining segments of an outermost antenna loop winding. Antenna assembly 300e include an outermost antenna loop winding from a plurality of antenna loop windings. The outermost antenna loop winding includes adjoining antenna segments 310e and 311e. Adjoining track segments (e.g., 310e and 311e) from the outermost antenna loop winding can define one or more gap regions (e.g., gap region 370e) in which one or more perforations 360e can be positioned. Adjoining track segments 310e and 311e are spaced apart by a distance 361e.

Figure 3F:
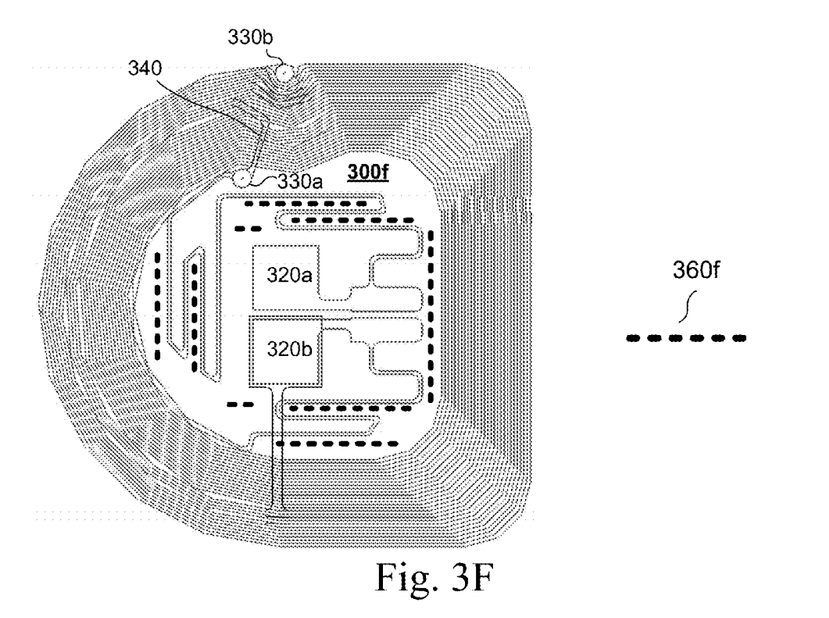
Figure 3G:
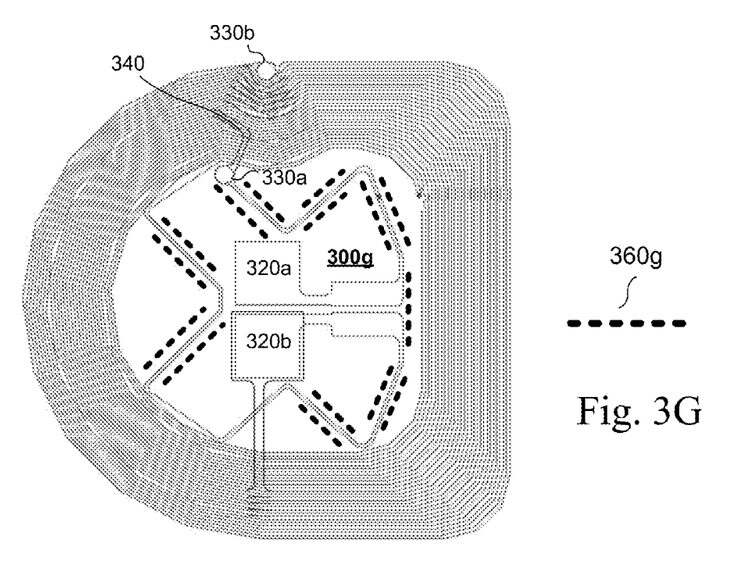

FIGS. 3F and 3G are top-views of additional RFID antenna assembly configurations 300f and 300g that include one or more gap regions between one or more segments of a cross-over track and/or segments of an innermost antenna loop winding. One or more perforations 360f and 360g (illustrated by a dashed line) can be positioned within the one or more gap regions.

Figure 3H:
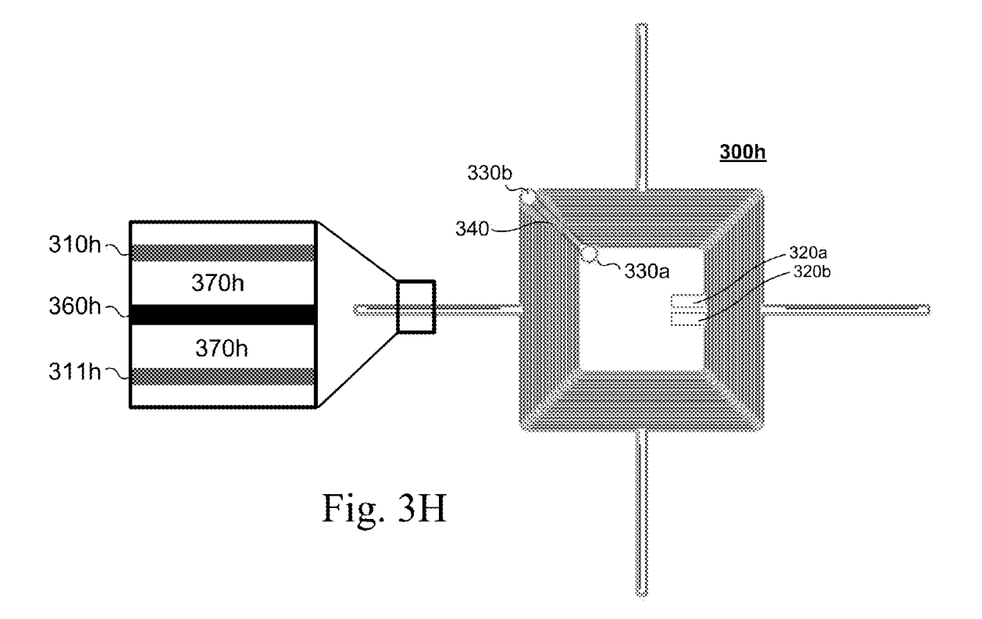

FIG. 3H is a top-view of a RFID antenna assembly configuration 300h that includes one or more gap regions between adjoining segments of an outermost antenna loop winding. Antenna assembly 300h include an outermost antenna loop winding from a plurality of antenna loop windings. The outermost antenna loop winding includes adjoining antenna segments 310h and 311h. Adjoining track segments (e.g., 310h and 311h) from the outermost antenna loop winding can define one or more gap regions (e.g., gap region 370h) in which one or more perforations 360h can be positioned. Adjoining track segments 310h and 311h are spaced apart by a distance 361h.

Similar to aspects of antenna assembly 200, in some embodiments of antenna assembly configurations 300a-300h, the width of each antenna track can be between 0.05 mm and 0.5 min (e.g., between 0.05 mm and 0.3 mm for small antennas), and the average distance of the spacing between adjacent tracks can be between 0.05 mm and 0.5 mm). Perforations 360a-360h can include, in any combination, one or more cuts, one or more holes, and/or one or more slits made into a substrate (not shown) on which antenna assemblies 300a-300h are positioned on. In some embodiments, gap distances (e.g., 361a-361e) between adjoining and/or adjacent antenna track segments and/or cross-over track segments are at least twice the average spacing between adjacent tracks in the plurality of antenna loop windings. In some embodiments, gap distances can range between at least two and fives times the average spacing (e.g., between 0.1 mm and 1.0 mm). Adjoining antenna segments can define lines with an angle less than 15 or 45 degrees.

Figure 4A:
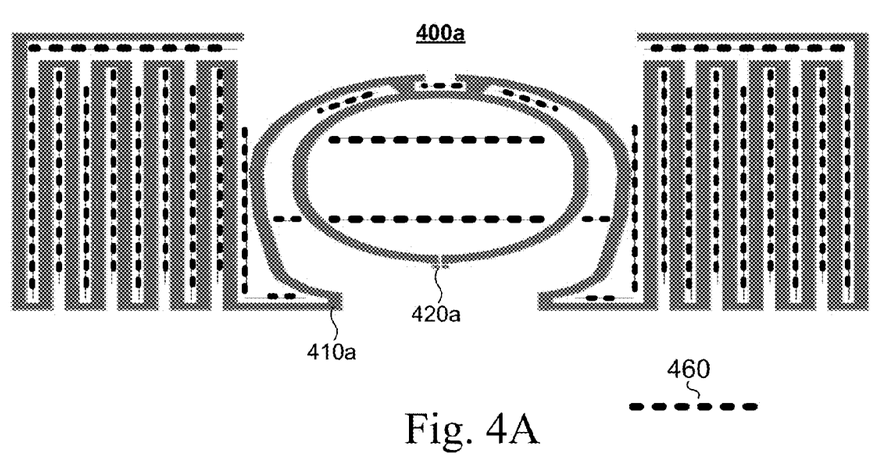
FIGS. 4A-4B are top-views of different UHF RFID antenna assembly configurations.
Figure 4B:
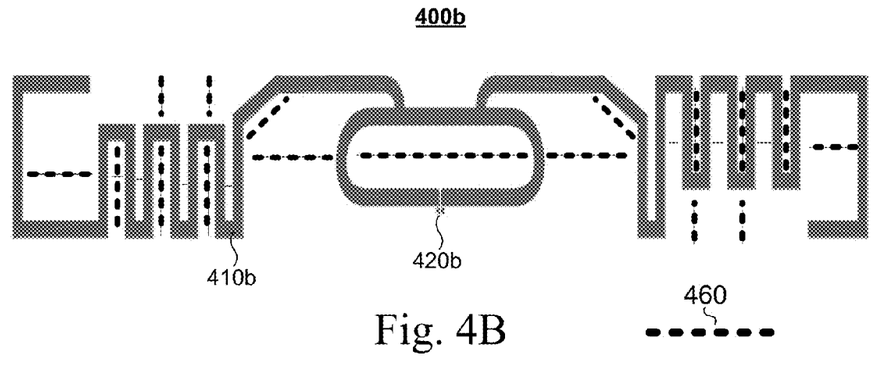

In addition to HF RFID antennas, the above-described techniques for defining gap regions and positioning perforations within the gap regions can be applied ultra-high frequency (UHF) RFID antennas. Typically, RFID systems that operate in the UHF range utilize a standard dipole antenna configuration for the RFID antenna assembly. FIGS. 4A-4B are top-views of different UHF RFID antenna assembly configurations 400a and 400b, which each include, respectively, dipole antenna tracks 410a and 410b, and at least two contact pads 420a and 420b. Each of antenna assembly configurations 400a and 400b also define one or more gap regions between one or more segments of adjoining and/or adjacent antenna tracks. One or more perforations 460 (illustrated by a dashed line) can be positioned within the one or more gap regions.

Figure 5A:
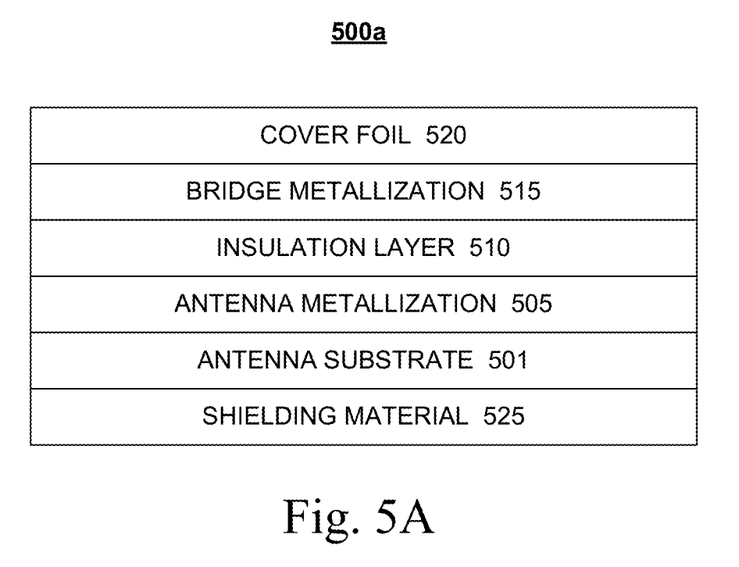
FIGS. 5A-5B are cross-sectional side-views of RFID structures.
Figure 5B:
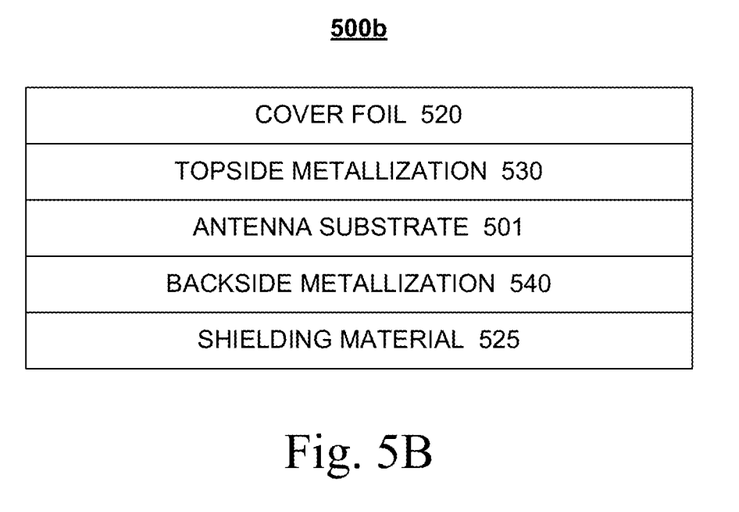

FIGS. 5A-5B are cross-sectional side-views of different RFID structures 500a and 500b. RFID structure 500a illustrates a single-sided antenna structure that includes an antenna substrate 501, an antenna metallization layer 505, an insulation layer 510, and a bridge metallization layer 515. In some embodiments, antenna substrate 501 includes a carrier foil made of any combination of: PET, PET-G, PP, PE, PI, PVC, PBT, LCP, ABS, PEN, glass fiber, epoxy, BT, and/or PC. In some embodiments, the bridge metallization layer 515 includes a cross-over track (e.g., 240 or 340). In some embodiments, the insulation layer 510 can be about the same size in area as the bridge metallization layer 515.

RFID structure 500b illustrates a double-sided antenna structure that includes an antenna substrate 501, a topside antenna metallization layer 530, and a backside antenna metallization layer 540. In some embodiments, the topside antenna metallization layer 530 includes the plurality of loop windings and the IC contact pads, while the backside antenna metallization layer 540 includes a cross-over track (e.g., 240 or 340). The backside antenna metallization layer 540 can be electrically coupled to the topside metallization layer 530 via one or more cross-over points (e.g., 330a and 33b) that go through the antenna substrate 501.

In some embodiments, RFID structures 500a and/or 500b can also include a cover foil layer 520 (e.g., a protective layer), and/or one or more adhesive and/or liner layers (e.g., layer 525) on the top layer, bottom layer, or both the top and bottom layers of the RFID structure. A shielding material layer (e.g., layer 525) can also be included in the structures 500a and/or 500b. Layer 525 can also represent the structure to which the RFID structures 500a and/or 500b are applied on. An adhesive layer can also be applied to any of the outmost layers on an RFID structure 500a or 500b. In some embodiments, perforations can be created in only the antenna substrate 501. In alternative or supplemental embodiments, perforations can also be made in any combination of other layers of the RFID structure (e.g., a shielding layer, an adhesive layer, a protective layer, etc.). In some embodiments, the protective or cover layer (e.g., 520) does not include perforations, advantageously hiding the perforations from visual inspection.

Figure 6:
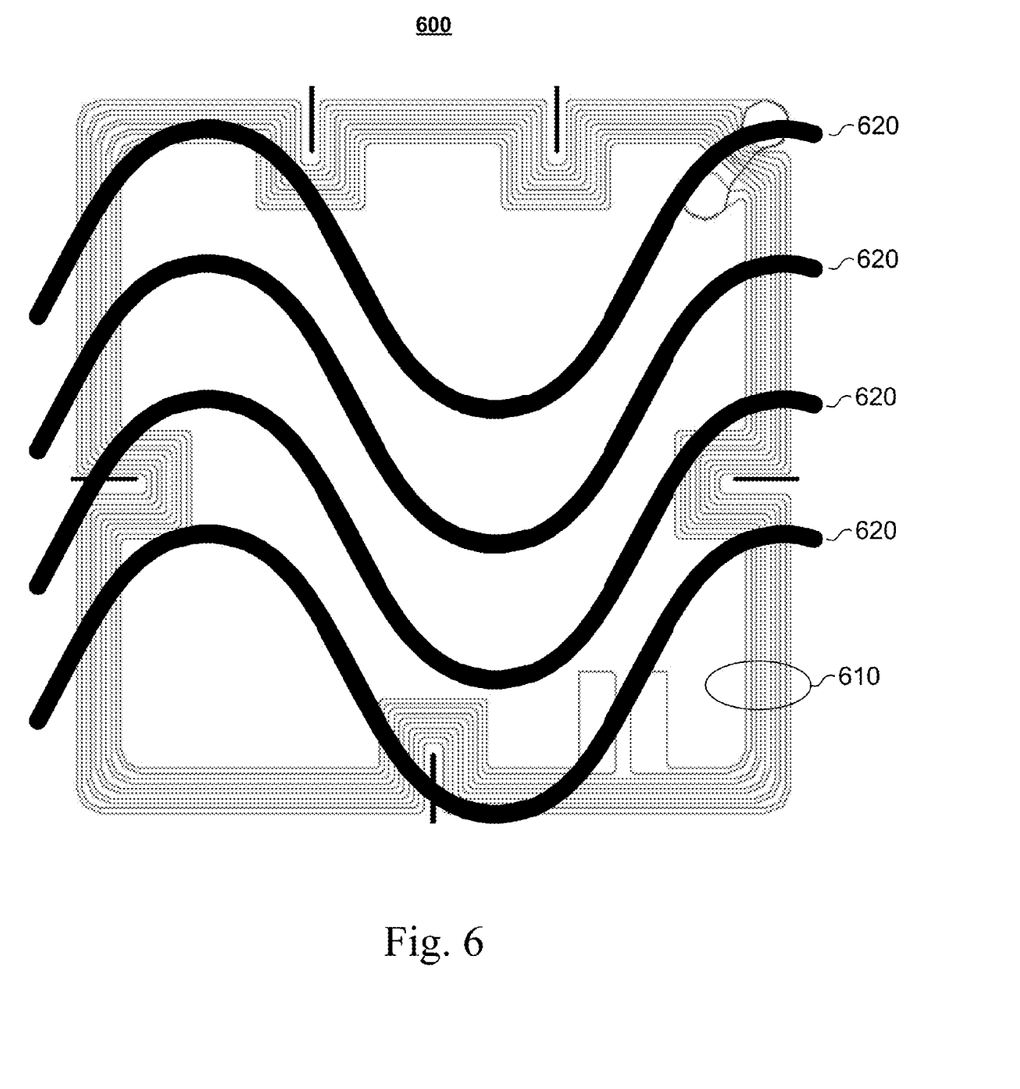
FIG. 6 is a top view of a RFID antenna assembly and substrate.

In another aspect, the antenna substrate of an RFID structure can be selectively removed independent of whether it overlaps with a portion of an antenna assembly. FIG. 6 is a top view of a RFID antenna assembly and substrate configuration 600. Configuration 600 includes an antenna assembly 610 formed by a metallization layer (e.g., 505, 530 and/or 540) and an antenna substrate (not show). The antenna substrate includes one or more perforations 620, which can be formed by using a laser to selective cut only in the carrier foil of the antenna (advantageously keeping the antenna metallization from being cut). Any geometry (e.g., lines, waves, grids, etc.) of perforations can advantageously be created using laser cutting in order to generate predefined break points. Other geometries like lines, grids and/or the like can be formed by laser cutting or laser engraving methods.

In some embodiments, the possible de-tuning resulting from any tracks added to define perforated-gap regions can be compensated for by adding or reducing the capacitance and/or inductance of the whole transponder. For example, frequency tuning can be accomplished by adding or reducing the area of a tuning capacitors (e.g., 150). Alternatively, the width and/or spacing between the plurality of loop windings can be modified.

In alternative or supplemental embodiments, including perforations in the antenna substrate of an RFID structure can be combined with other security features such as, for example, holograms and security foils.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed:

1. A method of manufacturing a RFID structure, the method comprising:
   providing an antenna substrate;
   providing a loop antenna assembly on the antenna substrate, the loop antenna assembly comprising:
      at least two contact pads; and
      a plurality of antenna loop windings having an average spacing between adjacent antenna loop windings of the plurality of loop windings, the plurality of antenna loop windings defining a plurality of gap regions that separate adjacent or adjoining antenna segments of the plurality of antenna loop windings by at least twice the average spacing,
   wherein the antenna substrate has a series of perforations and at least one perforation of the series of perforations is positioned directly beneath a segment of the plurality of antenna loop windings,
   wherein separating one of the series of perforations results in dissection of the loop antenna assembly and renders the loop antenna assembly inoperable; and
   wherein the perforations are formed by heating the antenna substrate using a laser after the loop antenna assembly has been positioned on the antenna substrate.

2. The method of claim 1, wherein the series of perforations comprise cuts, holes, slits, or any combination thereof.

3. The method of claim 1, wherein the plurality of antenna loop windings comprise one or more outer antenna loop windings and one or more inner antenna loop windings, at least one of the plurality of gap regions separates an antenna segment on an outermost winding of the one or more inner antenna loop windings with an adjacent antenna segment on an innermost winding of the one or more outer loop windings.

4. The method of claim 1, wherein the plurality of antenna loop windings comprises at least one track that includes two adjoining antenna segments that define lines having an angle less than 15 degrees and at least one of the plurality of gap regions is positioned between the two adjoining antenna segments.

5. The method of claim 4, wherein the at least one track comprises an outermost antenna loop winding of the plurality of antenna loop windings.

6. The method of claim 4, wherein the at least one track comprises an innermost antenna loop winding of the plurality of antenna loop windings.

7. The method of claim 1, wherein the average spacing is between 0.05 mm and 0.5 mm.

8. The method of claim 1, wherein the average spacing is between 0.08 mm and 0.12 mm.

9. The method of claim 1, wherein the one or more gap regions separate adjacent or adjoining antenna segments of the plurality of antenna loop windings by between 0.1 mm and 1.0 mm.

10. The method of claim 1, wherein the antenna substrate comprises a carrier foil including polyethylene terephthalate (PET), polyethylene terephthalate glycol-modified (PET-G), polypropylene (PP), polyethylene (PE), polyimide (PI), polyvinyl chloride (PVC), acrylonitrile butadiene styrene (ABS), liquid crystal polymer (LCP), polybutylene terephthalate (PBT), polyethylene naphthalate (PEN), glass fiber, epoxy, bismaleimide triazine (BT), polycarbonate (PC) or any combination thereof.

11. The method of claim 1 further comprising:
   applying an adhesive layer on a surface of the antenna substrate opposite the loop antenna assembly;

coupling an integrated circuit to the at least two contact pads; and applying a protective layer covering the loop antenna assembly and the integrated circuit.

12. The method of claim 1, wherein the RFID structure comprises a RFID label.

13. The method of claim 1, wherein the series of perforations are arranged in a wave pattern.

* * * * *